US010757483B2

(12) United States Patent
Hu et al.

(10) Patent No.: US 10,757,483 B2
(45) Date of Patent: Aug. 25, 2020

(54) METHOD AND APPARATUS FOR DATA TRACKING AND PRESENTING

(71) Applicant: Futurewei Technologies, Inc., Plano, TX (US)

(72) Inventors: Xun Hu, Santa Clara, CA (US); Xin Yu, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 26 days.

(21) Appl. No.: 15/795,193

(22) Filed: Oct. 26, 2017

(65) Prior Publication Data

US 2019/0132654 A1    May 2, 2019

(51) Int. Cl.
| | |
|---|---|
| H04N 21/858 | (2011.01) |
| H04N 21/234 | (2011.01) |
| H04N 21/4722 | (2011.01) |
| H04N 21/478 | (2011.01) |
| H04N 21/44 | (2011.01) |
| H04N 21/8547 | (2011.01) |
| H04N 21/414 | (2011.01) |
| H04N 21/84 | (2011.01) |

(52) U.S. Cl.
CPC ... H04N 21/8586 (2013.01); H04N 21/23418 (2013.01); H04N 21/41407 (2013.01); H04N 21/44 (2013.01); H04N 21/4722 (2013.01); H04N 21/47815 (2013.01); H04N 21/84 (2013.01); H04N 21/8547 (2013.01)

(58) Field of Classification Search
CPC .... H04N 21/8586; H04N 21/44; H04N 21/84; H04N 21/23418; H04N 21/41407; H04N 21/4722
See application file for complete search history.

(56) References Cited

U.S. PATENT DOCUMENTS

| | | | |
|---|---|---|---|
| 6,229,541 B1 | 5/2001 | Kamen et al. | |
| 7,360,232 B2* | 4/2008 | Mitchell | H04N 7/165 348/460 |
| 7,444,659 B2* | 10/2008 | Lemmons | H04N 7/17318 375/E7.006 |

(Continued)

FOREIGN PATENT DOCUMENTS

CN    1391676 A    1/2003

OTHER PUBLICATIONS

"Image Recognition," TensorFlow, www.tensorflow.org/tutorials/image_recognition, last updated Nov. 2, 2017, 11 pages.

(Continued)

Primary Examiner — Sumaiya A Chowdhury
(74) Attorney, Agent, or Firm — Fish & Richardson P.C.

(57) ABSTRACT

Embodiments provide methods and devices for providing object information associated with a media program. Embodiments include identifying an object of interest in an image of a frame of the media program; inserting an indicator into the image of the frame to identify the object of interest; generating a video clip associated with the identified object based on a portion of the media program; constructing an information page containing information regarding the object of interest, wherein the information page comprises a window for displaying the video clip; and transmitting the information page, including the video clip, to the user device.

16 Claims, 7 Drawing Sheets

(56) References Cited

U.S. PATENT DOCUMENTS

| | | | |
|---|---|---|---|
| 10,116,976 B2* | 10/2018 | Shaw | H04N 21/2387 |
| 2002/0087969 A1 | 7/2002 | Brunheroto et al. | |
| 2007/0261079 A1 | 11/2007 | Pack et al. | |
| 2014/0052770 A1 | 2/2014 | Gran et al. | |
| 2014/0074621 A1* | 3/2014 | Chai | G06Q 30/0251 |
| | | | 705/14.66 |
| 2017/0026708 A1 | 1/2017 | Clayton | |
| 2018/0132011 A1* | 5/2018 | Shichman | H04N 21/234 |

OTHER PUBLICATIONS

"Amazon Rekognition," aws.amazon.com/rekognition, downloaded Dec. 6, 2017, 22 pages.

Adrian Rosebrock, "Tutorial: Using CamShift to Track Objects in Video," www.computervisiononline.com/blog/tutorial-using-camshift-track-objects-video, downloaded Dec. 6, 2017, 11 pages.

Adrian Rosebrock, "OpenCV Track Object Movement," www.pyimagesearch.com/2015/09/21/opencv-track-object-movement, Sep. 21, 2015, 53 pages.

"Motion-Based Multiple Object Tracking," www.mathworks.com/help/vision/examples/motion-based-multiple-object-tracking.html, downloaded Dec. 6, 2017, 9 pages.

SpaceCraft Support Knowledge Base, "How can I set specific start and end times for an embedded video?" www.support.gospacecraft.com/hc/en-us/articles/204744184-How-can-I-set-specific-start-and-end-times-for-an-embedded-video-, downloaded Dec. 6, 2017, 3 pages.

"Fast GStreamer overlay element," RidgeRun Developer, www.developer.ridgerun.com/wiki/index.php/Fast_GStreamer_overlay_element#Overlay_logo, last edited Jun. 2, 2017, 9 pages.

"Drawing on Images in Simple CV," http://tutorial.simplecv.org/en/latest/examples/display.html#making-a-custom-display-object, downloaded Dec. 6, 2017, 16 pages.

"vMix Live Production Software Features," www.vmix.com/software/features.aspx, downloaded Dec. 6, 2017, 8 pages.

* cited by examiner

METHOD AND APPARATUS FOR DATA TRACKING AND PRESENTING

TECHNICAL FIELD

The present disclosure generally relates to data editing, data tracking and presenting of a media program, and more specifically to a method, server and mobile device for providing object information associated with a media program.

BACKGROUND

Media programs such as movies, television programs, slideshows, and video presentations can contain abundant of information, for example images of actors, images of clothing, images of bags, kitchen ware and other goods. Information about the things read, seen and heard in a media program is not always discernable from the media program itself as it is playing. For example, the brand of a particular jacket showing at a specific time in a movie may not be readily determined at the time it plays in the movie. Some viewers of a media program may want to learn more information about images or music at the time they watch the program.

SUMMARY

An example embodiment includes a method for providing object information associated with a media program including identifying an object of interest in an image of a frame of the media program; inserting an indicator into the image of the frame to identify the object of interest; generating a video clip associated with the identified object based on a portion of the media program; constructing an information page containing information regarding the object of interest, wherein the information page comprises a window for displaying the video clip; transmitting the media program to a user device; sending a URL of the information page to the user device; receiving a request for the information page in connection with the user device displaying the media program; and transmitting the information page, including the video clip, to the user device.

Optionally, in any of the preceding embodiments, wherein the indicator is adjacent over the object of interest.

Optionally, in any of the preceding embodiments, wherein the indicator is located in a corner of image of the frame.

Optionally, in any of the preceding embodiments, the method further include identifying the object of interest in the frame when the object matches an object ID in a product library.

Optionally, in any of the preceding embodiments, the method further include transmitting the media program to a first user device; sending the URL of the information page to a second user device; receiving a request for the information page in connection with the first user device displaying the media program; and transmitting the information page, including the video clip, to the second user device; wherein the first user device and the second user device are different user devices.

Optionally, in any of the preceding embodiments, wherein transmitting the information page, including the video clip, to the user device further comprises: wherein the video clip comprises a most current time stamp of the media program displaying on the user device.

An example embodiment includes a server for providing object information associated with a media program, the server includes a memory storing instructions; and one or more processors coupled to the memory, wherein the one or more processors execute the instructions to: identify an object of interest in an image of a frame of the media program; insert an indicator into the image of the frame to identify the object of interest; generate a video clip associated with the identified object based on a portion of the media program; construct an information page containing information regarding the object of interest, wherein the information page comprises a window for displaying the video clip; transmit the media program to a user device; send a URL of the information page to the user device; receive a request for the information page in connection with the user device displaying the media program; and transmit the information page, including the video clip, to the user device.

Optionally, in any of the preceding embodiments, wherein the indicator is adjacent over the object of interest.

Optionally, in any of the preceding embodiments, wherein the indicator is located in a corner of the image of the frame.

Optionally, in any of the preceding embodiments, the server further include identifying the object of interest in the frame when the object matches an object ID in a product library.

Optionally, in any of the preceding embodiments, wherein transmitting the information page, including the video clip, to the user device further comprises: wherein the video clip comprises a most current time stamp of the media program displaying on the user device.

An example embodiment includes a method for providing object information associated with a media program, the method include obtaining a URL of an information page associated with an object of interest, wherein the object of interest is presented in a frame of the media program and the frame comprises an indicator identifying the object of interest; requesting the information page at the URL; receiving the information page comprising a window for displaying a video clip, wherein the video clip is associated with the object of interest based on a portion of the media program; displaying the information page and the video clip in the window.

Optionally, in any of the preceding embodiments, the method further includes obtaining the URL of the information page upon receiving a user request.

Optionally, in any of the preceding embodiments, wherein the URL is shown by a user interface (UI) image, wherein the UI image is shown when an application runs on a mobile device.

Optionally, in any of the preceding embodiments, the method further includes updating the URL when an application runs on a device, wherein the video clip comprises a most current time stamp of the media program displaying in the window.

An example embodiment includes a mobile device for providing object information associated with a media program, a memory storing instructions; and a processor coupled to the memory, wherein the processor executes the instructions to: obtain a URL of an information page associated with an object of interest, wherein the object of interest is presented in a frame of the media program and the frame comprises an indicator identifying the object of interest; request the information page at the URL; receive the information page comprising a window for displaying a video clip, wherein the video clip is associated with the object of interest based on a portion of the media program; display the information page and the video clip in the window.

Optionally, in any of the preceding embodiments, the device further includes obtaining the URL of the information page upon receiving a user request.

Optionally, in any of the preceding embodiments, wherein the URL is shown by a user interface (UI) image, wherein the UI image is shown when an application runs on a mobile device.

Optionally, in any of the preceding embodiments, the device further includes updating the URL when an application runs on a device, wherein the video clip comprises a most current time stamp of the media program displaying in the window.

DETAILED DESCRIPTION

Reference will now be made in detail to embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the embodiments may be practiced without these specific details or that various changes and substitutions can be made thereto without departing from the spirit and scope of the present disclosure. In other instances, well-known methods, procedures, components, and circuits have not been described in detail so as not to unnecessarily obscure aspects of the embodiments.

The producers of media programs such as movies, television shows, straight to digital storage medium productions, online videos, etc. often want to provide information to their viewers about items within the programs. Advertisement producers also take the chance to place advertisements of products within the context of the program. Some advertisements interrupt the flow of the program to show goods, or add abruptly ads content into the program which can make the program less enjoyable for viewers who are not interested in the product.

Similarly, some producers have tried to not disturb the flow of the program by adding pop-up ads as overlays on some media programs, which can still make the program less enjoyable for many viewers.

There is a need for producers to provide advertisements in a more pleasant way.

Moreover, some viewers of the media program may have interest to learn more information about images or music when they are watching the program. An immediate access to more information about whatever images or sounds that are playing in the media program would work effectively to gain customers.

Hereby a story is introduced to show a real life example that may happen according to a solution provided by an embodiment of the present disclosure. A user subscribes a service from a content provider. The user may leave a preferable list of interest during subscription. The user may install an application along with the service on a mobile device of his own. In the embodiment, the user is viewing a media program on TV; an indicator is shown from time to time which presents there is an object shown by the indicator for further information, the object may be a bag, or a kitchen ware or any good for sale; when the user feels interested, the user may pause the media program or let it continue, and turn on an application in a mobile device; an image of the object that the users just watched from the media program is shown on the application; along with the image, a couple of lines of brief information are provided related to the object; the user can click on the image or the lines of brief information for additional information of the object.

Additionally when the user clicked on the image, a video clip, to be specifically a clip of the media program that the user just watched may be played on a screen of the mobile device, and the video clip is focusing on the scenes with the object in the media program. Optionally the indicator is configured as a transparent icon.

Optionally the indicator may be a flash on a display or the like with the purpose to inform people there is potential additional information. A size of the indicator may be designed to fit viewing to catch people's attention. But the indicator may be designed in a way that can be easily ignored by the user if the user does not feel interested in the object so that the user would not be bothered from the viewing, but to inform the user the object is with potential more information in the application. The indicator may be an indicator of an icon, a pointer, a sign, a flash, a box or the like; the indicator may be with a specific shape such as a rectangular, a triangle, a round or a 3D or etc.

Figure 1:
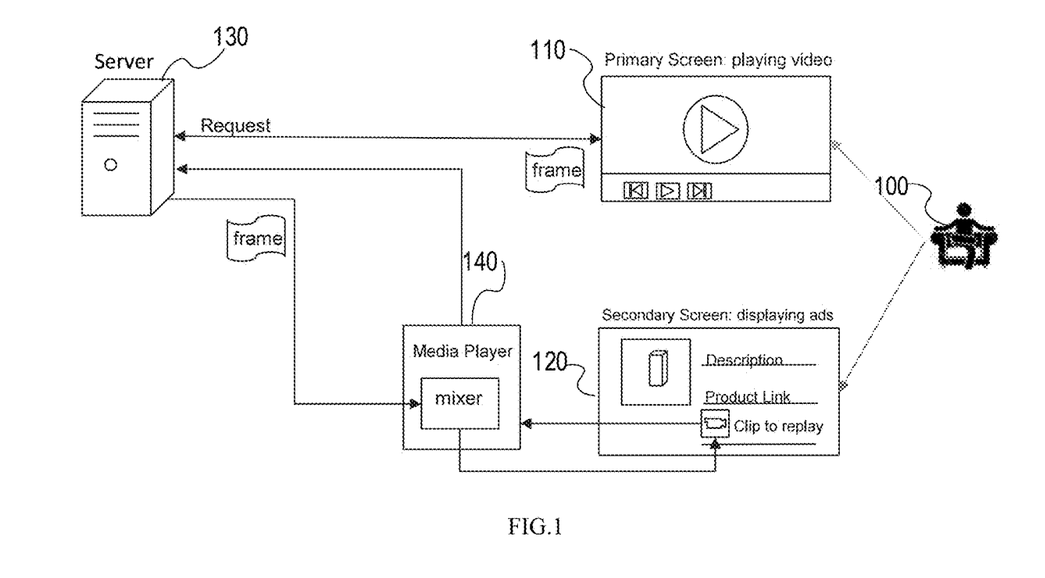
FIG. 1 is a diagram structure that illustrates an example flow of data tracking and presenting in a media program according to an embodiment of the present disclosure.

FIG. 1 is a diagram structure that illustrates an example flow of data tracking and presenting in a media program according to an embodiment of the present disclosure.

A user 100 watches a media program on a first display 110. A second display 120 is also available to the user 100 for additional information. A server 130 may process on one or more frames of a media program, identify an object in a frame of the media program when the object matches an object ID in a product library, and edit the frame of the media program. The server 130 may be a streaming server which may also provide media programs, or an advertisement platform (not shown by FIG. 1) which may also provide media program with advertisements. Optionally a location or a position of the object in the one or more frames of the media program is also identified by the server 130 at the same time. The product library includes a database of goods for sale, which has brand name of the goods, price, images of the goods, manufacture place, usage handbook, etc. The identifying process may be implemented either by an image processing algorithm automatically while the media program is playing or tagging the object manually before a media program is played. The process is repeated for various frames of the media program to identify objects in the frames. The one or more frames of the media program may be received from a separate media program provider or from a same provider who operates the server. If the server 130 receives the media program when the media program is playing on a first display 110, a synchronization signal may be transmitted between the server 130 and the first display 110. The object is identified and a time stamp of the object is recorded at the same time. The time stamp records a start-time and an end-time of the showing of the identified object in the one or more frames of the media program. As the ongoing of the media program on the first display 110, the synchronization signals are transmitted periodically to the server 130. The first display 110 and the second display 120 may be separate windows on one screen or separate screens on the same device or on different devices.

The server 130 sends one or more frames of the media program with the one or more identified objects to a media player mixer 140. Optionally the information of position of the identified objects in the one or more frames of the media program is also sent to the media player mixer 140 by the server 130. The media player mixer 140 revises or edits a limited amount of data from the frame by embedding an indicator on a location of a frame of the media program that includes an image of the identified object. The indicator may be designed as described in various embodiments in the present disclosure.

The server 130 updates a user interface (UI) and related information to the one or more identified objects on an application periodically or when being requested by the application, or when the application is turned on. The application may be installed and run in a user device. The UI, in industrial design field of human—computer interaction, is the space where interactions between humans and machines occur. The goal of this interaction is to allow effective operation and control of the machine from the human end, whilst the machine simultaneously feeds back information that aids the operators' decision-making process. Examples of this broad concept of user interfaces include the interactive aspects of computer operating systems, hand tools, heavy machinery operator controls, and process controls. The UI is generally assumed to mean a graphical user interface.

Along with the UI, a couple of lines are provided which are related to the object which tell brief information about the one or more identified objects. When the images or the lines of brief information are selected, more information are shown for additional information of the object. Optionally when an image of the UI is selected, a video clip, to be specifically a clip of the media program, is played on a second display 120. The second display 120 may be different display from the first display 110. Based on an ID by a users' subscription or the synchronization signals between the first display 110 and the server 130, the server 130 may update the UI and related information to the one or more identified objects on the application to match the media program that is playing on the first display 110. Therefore, when an image UI is selected, the video clip being retrieved from the server 130 is with a time stamp most close to the current actual time of the media program on the first display 110. The video clip to be played on the second display 120 shows an identified object that has been just shown on the first display 110 in a short time. The short time is the difference between the time stamp of the video clip and the current actual time of the media program on the first display 110.

There may be a plurality of clips of a media program to be played on the second display that may be stored in a database or generated at the time the media program is playing on the first display 110. A clip of the media program may include a particular piece of one or more scenes of the media program. The plurality of clips of the media program may be stored or generated to display piece by piece of the one or more scenes of the media program. The clip of the media program may be produced based on a media format or a media template from a portion of the media program associated with the identified object. The revision or the generation of the frame is carried out preferably without altering data that have been embedded in the media program itself. The process of embedding of one or more indicators may be repeated for various frames of the media program.

The UI and related information to the one or more identified objects on the application may be updated periodically, when being requesting to the server 130, when a user turns on the application, or when a user pauses the media program playing on the first display.

The UI and related information to the one or more identified objects on the application may be arranged by a time sequence, the latest updated one may be shown on the top. Each image UI or the brief information line may represent a resource that is specific to a video clip of the media program to be played by the device and accessible through a database. When an image UI is selected, a video clip associated to the image UI may be replayed on the second display 120 or a selected screen that is available. The UI may be configured to link to various URL's that point to video clips related to the identified object. Content and process of making the video clip is to be discussed further below.

Figure 2:
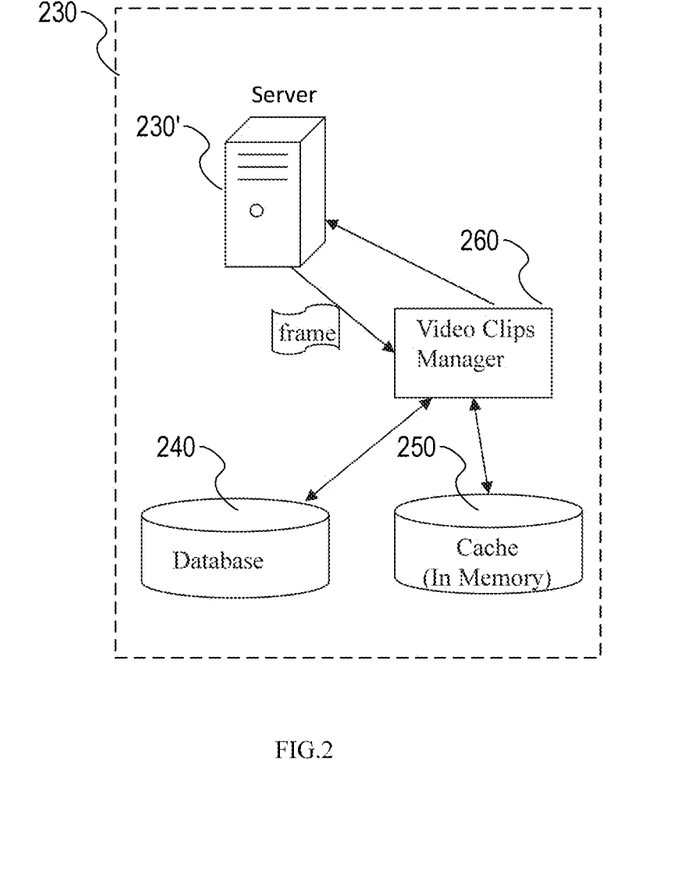
FIG. 2 illustrates a diagram of managing one or more video clips of one or more media programs according to an embodiment of the present disclosure.

FIG. 2 illustrates a diagram of managing one or more video clips of one or more media programs according to an embodiment of the present disclosure. As described above in FIG. 1, the server 130, in FIG. 2 with the reference number of 230, identifies an object in a frame of the one or more media programs when the object matches an object ID in a product library. The information of the identified object as well as the location or position of the identified object in the media program may be sent by the server 130, 230 to a clip manager 260. The clip manager 260 may generate video clips based on the media programs. The clip manager 260 may determine if a record of the identified object exists in a cache or a memory 250. If there is a related or recognized record of the identified object, for example a related object ID, exists in the cache 250, then the existed record may be updated. If there is no a related or recognized record of the identified object exists in the cache 250, then a related record of the identified object may be generated. The record of the identified object may be an instance in the cache. A database 240 stores video clips of the media programs.

Figure 3:
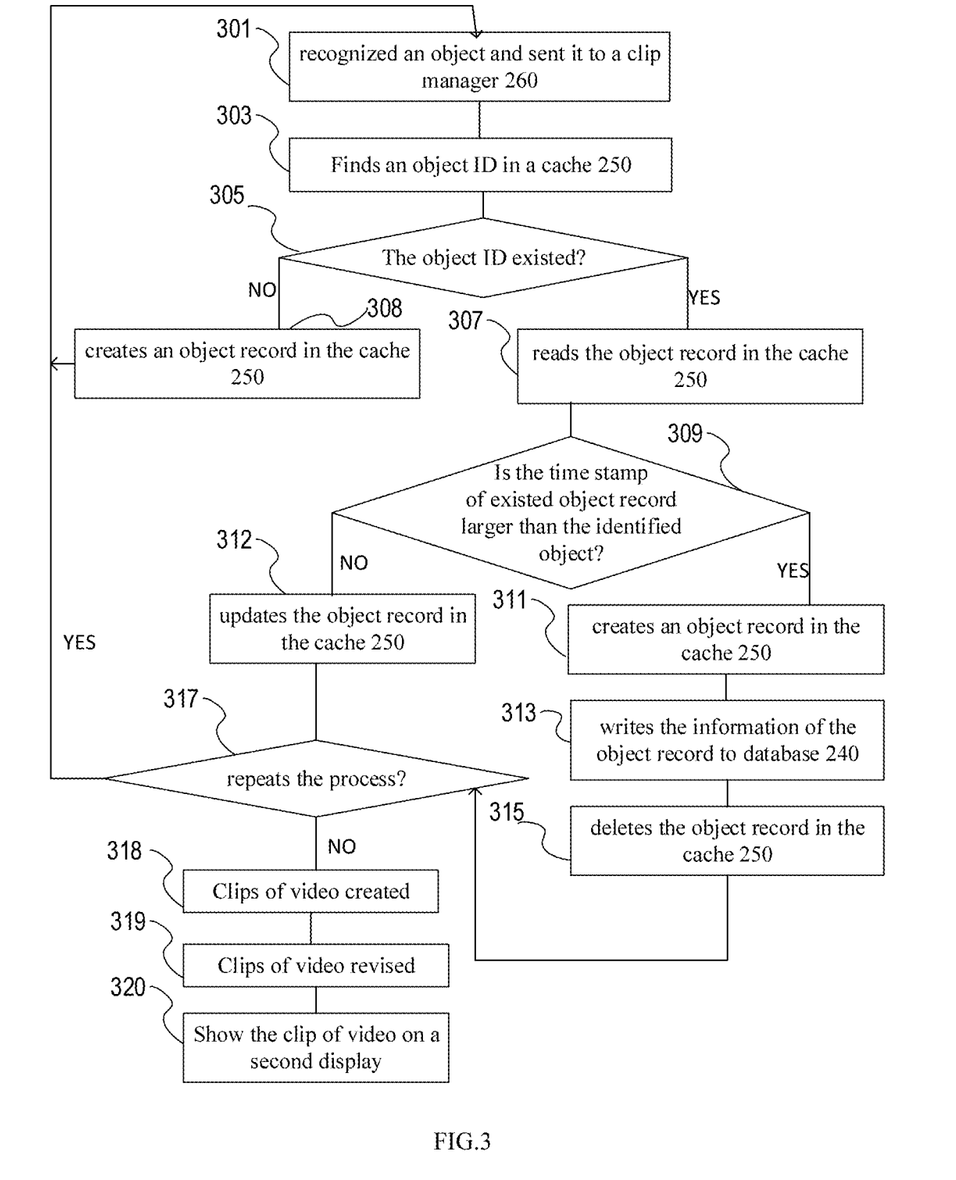
FIG. 3 shows a flow chart with respect to FIG. 1 and FIG. 2 according to an embodiment of the present disclosure.

FIG. 3 shows a flow chart with respect to FIG. 1 and FIG. 2 according to an embodiment of the present disclosure.

At step 301, the server 130, 230 recognizes an object from a video frame and sends related object ID and position of the object in a frame of a media program to a clip manager 260.

At step 303, the clip manager 260 looks for a related object ID in a cache 250.

At step 305, the clip manager 260 determines if a related or a recognized object ID exists in the cache 250; if not, go to step 308, if yes, go to step 307.

If there is no such related or recognized object ID exists in the cache 250, at step 308, an object record is generated in the cache 250; the object record is set up in the cache 250, the object record may include items such as information of the object ID, a current time stamp, and a current position.

Optionally with a clip_start_time stamp and a clip_end_time stamp. For example, an object record may include information of items at step 310 (not shown by the FIG. 3) as follows:

set object in cache:
Object_id: object ID
Movie_id: movie ID
Current_clip_start_time: current timestamp;
Current_clip_end_time: current timestamp;
Current_positions: add position to list The movie_id may indicate which movie the object is identified from.

After the object record is set up at step 308, the process may return to step 301 and repeat the steps thereof.

If there is such related or recognized object ID exists in the cache 250, at step 307, the object record is read in the cache 250;

At step 309, the object record is compared in the cache 250 with the identified object, if a difference between a current clip_end_time of the object record in cache and a current_clip_end_time of the identified object is larger than a certain time interval; if the comparison result is yes, go to step 311; if the comparison result is no, go to step 312.

If the comparison result is yes, which means the difference is larger than the certain time interval; an object record is generated at step 311, by including following items:

calculating:
time_range: (current_clip_start_time, current_clip_end_time)
positions: current_positions
avg_img_proportion: calculate the average proportion using positions in "positions" field.

At step 313, the information of the object record is written to database 240.

At step 315, the object record is deleted in the cache 250. Then the process moves to step 317.

If the comparison result is no, which means the difference is smaller than the certain time interval, at step 312, the object record is updated in the cache 250. The updated object record may include following items such as update item of "a current_clip_end_time" with "clip_end_time" in the identified object, and add object position to item of "current positions" in the identified object. An example of the updated object record may include items:

a clip_end_time stamp: current timestamp
current positions: current position

When the object record in the cache 250 is updated, the process goes to step 317.

At step 317, when next time interval starts, the process of steps 301-317 may be repeated. The process may be repeated till the cache is full or all identified objects are cached.

A video clip may be generated based on the received media program with referring to the related object record.

The clip manager 260 stores the one or more object records and provides the object records as basis information for a clip of the object record. At step 318, one or more video clips are generated with related information of the clips of the object record. The video clips include information of timestamp and related scenes of identified objects in the media program. At step 319, the media player mixer 140 may revise or edit the media program. Optionally at step 320, the video clips that are presented in the second display 120 of FIG. 1 may get the resource from the clip manager 260 or the server 230. The clip manager 260 may retrieve media program resource from the server 230 and generate video clips related to the object records thereof.

Optionally the video clips that are presented in the second display 120 of FIG. 1 may be obtained from a third party. The clip manager 260 and the server 230 may be separate entities or combined in one element server.

Optionally the ongoing of the media program on the first display 110, the video clips may be pushed periodically to the server 130, 230.

The clip manager 260 may check and generate video clips or object records periodically. Or the clip manager 260 may be a passive module driven by the server 130, 230

By doing so, items of a clip_end_time of different object records are compared, when a difference between a current_clip_end_time of the object record in cache and a clip_end_time of an identified object is larger than a certain time interval, then steps of 311, 313, 315, 317 are repeated, otherwise steps of 312, 317 are repeated.

The video clips manager 260 or the database 240, or the cache 250 may be located in the server 130 or separately from the server 130.

Figure 4:
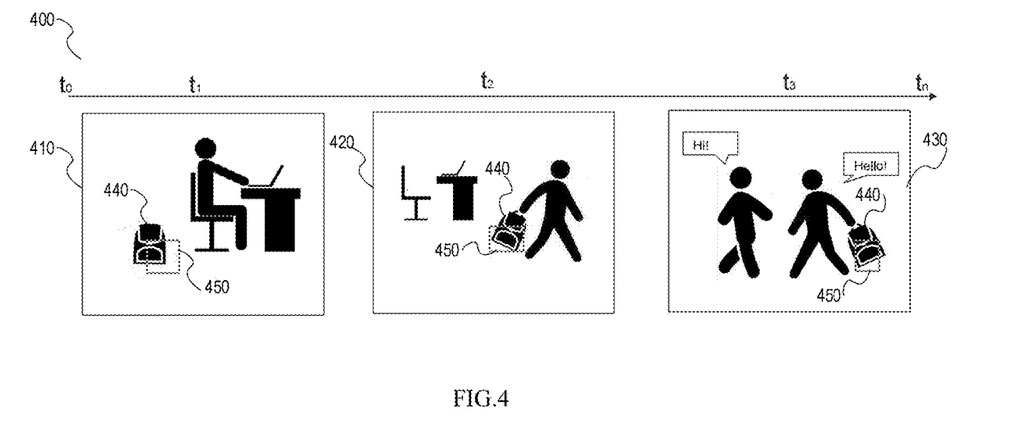
FIG. 4 shows an example of object tracking and presenting in a media program on a first display 400 according to an embodiment of the present disclosure.

FIG. 4 shows an example of object tracking and presenting in a media program on a first display 400 according to an embodiment of the present disclosure. The first display may be shown on a user device. Example scenes 410, 420, 430 of the media program are shown on the first display 400 with respect to a time sequence of $t_0$, $t_1$, $t_2$, $t_3$, $t_n$. At scene 410 which is played at $t_0$, $t_1$, a person and some kinds of items in the media program are shown, a backpack 440 is shown specifically with an indicator 450. A backpack 440 is a product of bag, preferably with shoulder straps which is convenient for traveling and hiking or holding a laptop. Here the backpack 440 represents an object of product that has been identified in above embodiments to show potential information that may be available thereof. As time sequence goes by, the media program goes on playing to next scene. At scene 420, the backpack was taken away from where it used to be at scene 410, and the indicator 450 moves as the backpack changes positions so that the backpack 440 is kept on being indicated. At scene 430, the backpack 440 was kept on being moved, and so did the indicator 450 move with the backpack 440 wherever the backpack 440 may be shown on the first display 400.

Example scenes 410, 420, 430 shown on the first display 400 may be video clips of the media program that have been generated by the server 130, 230 according to embodiments described in the present disclosure. The user device may retrieve the example scenes 410, 420, 430 from the server 130, 230.

Figure 5:
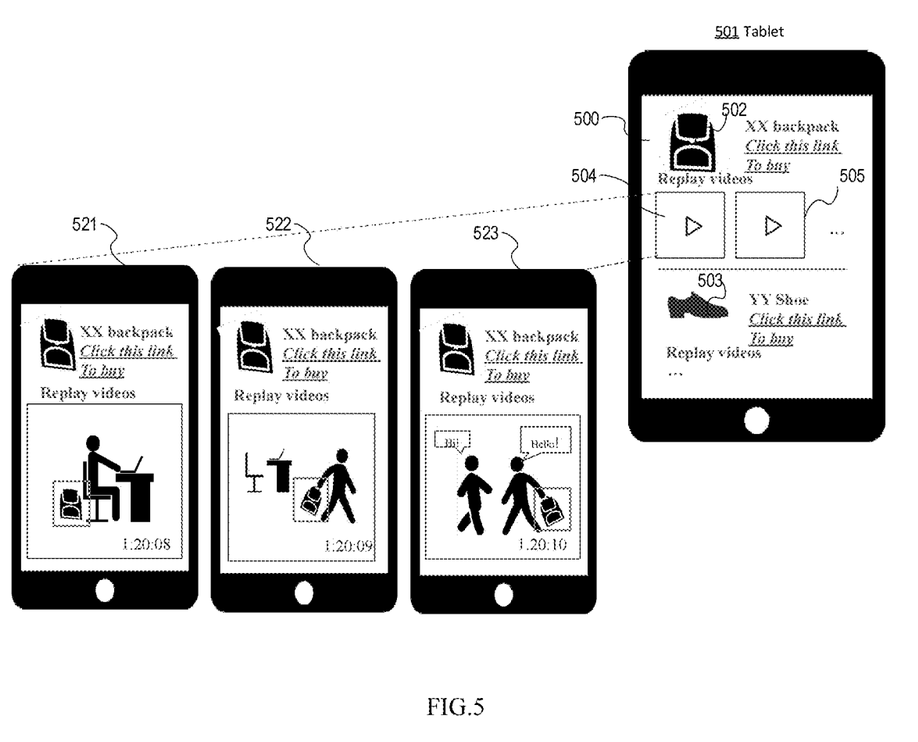
FIG. 5 shows an example of object tracking and presenting in a media program in a second display 500 according to an embodiment of the present disclosure.

FIG. 5 shows an example of object tracking and presenting in a media program in a second display 500 according to an embodiment of the present disclosure. As described above, a user 100 is viewing a media program on a first display 110, 400, when the user 100 feels interested in an object which is identified with a transparent indicator, the user 100 may pause the media program or let it continue, and turn on an application in a tablet 501. The tablet 501 may also be a mobile device, a laptop, a personal computer, or a device as such. The tablet 501 may have a second display 500. The application may have a plurality of UI 502, 503, 504, 505 on a face or menu of the application when the application is turned on. Along with the UI 502, 503, 504, 505, a couple of lines are provided which are related to an object of the one or more identified objects which is located on the menu closely to the couple of lines. The couple of lines may tell brief information about the one or more identified objects. When the images or the lines of brief information are selected, more information are shown for additional information of the object. Optionally when an image of the UI 504 is selected, a video clip is played on a second display 120, 500. The second display 120, 500 may be different display from the first display 110, 400. Based on an ID by a users' subscription or the synchronization signals communicating between the first display 110 and the server 130, the server 130 may update the UI and related information to the one or more identified objects on the application to match the media program that is playing on the first display 110. Therefore, when an image UI is selected, the clip of the media program being retrieved from the server 130 is with a time stamp of the closest earlier than the current actual time of the media program on the first display 110, 400. The clip of the media program to be played on the second display 120, 500 shows an identified object that has been just shown on the first display 110, 400 in a short time. For example, the video clip linked by the selected image UI 504 may preferably cover scenes 541, 542, 543 with respect to a time sequence of $t_0$-$t_2$ of FIG. 4, when the user turns on the application at the time slot of $t_3$ at which the media program is shown on the first display 400. The scenes 541, 542, 543 shown on the second display 500 may have been edited to include additional information to the original scenes of the media program. Preferably a plurality of image UI's are listed as an order of time sequence on the menu UIs of the application, where the top UI is linked to the video clip of a time sequence which is most close to the current actual time sequence of the media program shown on the first display 110, 400. The time sequence may be shown with a time stamp of the media program.

Figure 6:
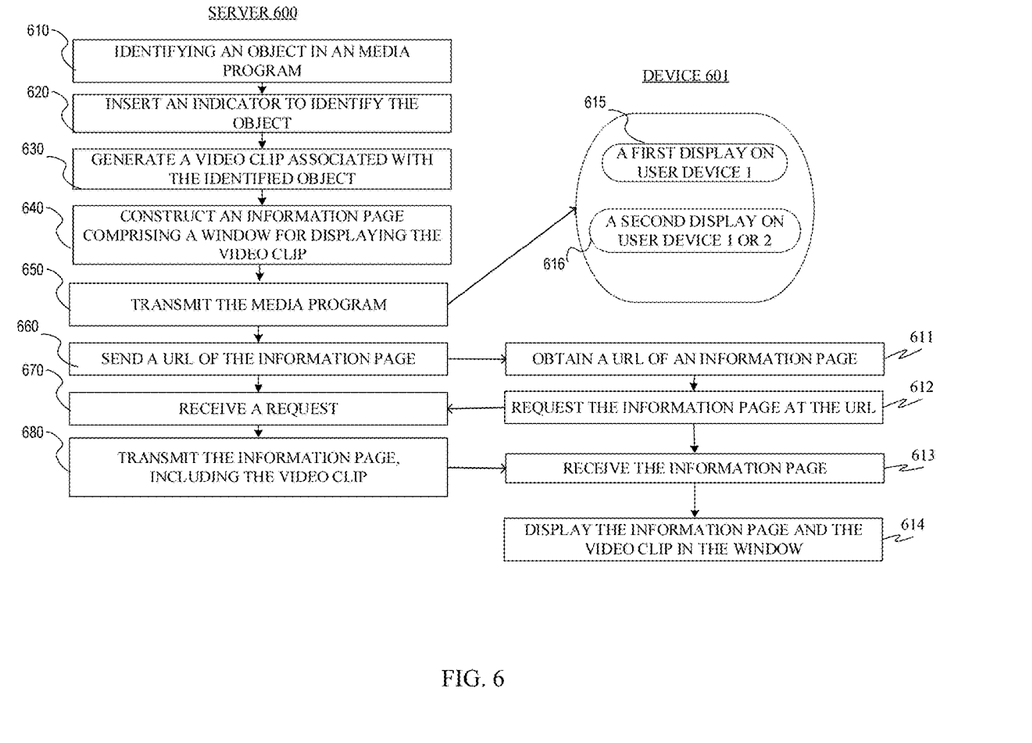
FIG. 6 is a flow chart of providing object information associated with a media program according to an embodiment of the present disclosure.

FIG. 6 is a flow chart of providing object information associated with a media program according to an embodiment of the present disclosure. A server 600 communicates with a device 601. The server 600 may be a media program provider or a media player mixer or a server. The server 600 may comprise a server 130, 230 as described in above figures and embodiments. At step 610, the server identifies an object of interest in an image of a frame of the media program; at step 620, inserts an indicator into the image of the frame to identify the object of interest; at step 630, generates a video clip associated with the identified object based on a portion of the media program; at step 640, constructs an information page containing information regarding the object of interest, wherein the information page comprises a window for displaying the video clip; at step 650, transmits the media program to a user device 601; at step 660, sends a URL of the information page to the user device 601; at step 670, receives a request for the information page in connection with the user device 601 displaying the media program; and at step 680, transmits the information page, including the video clip, to the user device 601. These steps may be carried out in a different order as described herein.

The device 601 may be one device with a plurality of displays (a first display, a second display) or separate devices (device 1, device 2) with separate displays (a first display, a second display). At step 611, the device 601 obtains a URL of an information page associated with an object of interest, wherein the object of interest is presented in a frame of the media program and the frame comprises an indicator identifying the object of interest; at step 612, requests the information page at the URL; at step 613, receives the information page comprising a window for displaying a video clip, wherein the video clip is associated with the object of interest based on a portion of the media program; at step 614, displays the information page and the video clip in the window. The steps as described herein may be carried out in a different order.

Figure 7:
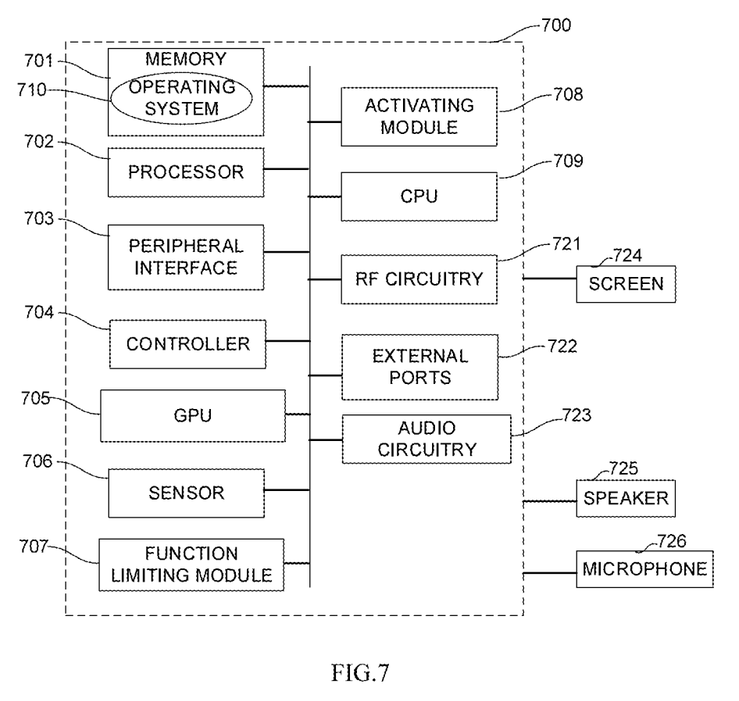
FIG. 7 is a block diagram illustrating components of a machine 700 in accordance to some embodiments of the present disclosure.

FIG. 7 is a block diagram illustrating components of a machine 700 in according to some example embodiments of the present disclosure, able to read instructions from a machine-readable medium (e.g., a machine-readable storage medium) and perform any one or more of the embodiments discussed herein.

Specifically, FIG. 7 shows an example form of a computer system, within which instructions e.g., software, a program, an application, an applet, an app, or other executable code for causing the machine 700 to perform any one or more of the embodiments discussed herein may be executed. For example the instructions may cause the machine to execute the flow diagrams of FIGS. 1-6. The instructions transform the general, non-programmed machine into a particular machine programmed to carry out the described and illustrated functions in the manner described. In alternative embodiments, the machine 700 operates as a standalone device e.g. a mobile device or may be coupled (e.g., networked) to other machines. In a networked deployment, the machine 700 may operate in the capacity of a server machine or a client machine in a server-client network environment. The machine 700 may comprise, but is not limited to, a server computer, a client computer, a personal computer (PC), or any machine capable of executing the instructions of flows of FIGS. 1-6, sequentially or otherwise, that specify actions to be taken by machine 700. Further, while only a single machine 700 is illustrated, the term "machine" shall also be taken to include a collection of machines 700 that individually or jointly execute the instructions of flows of FIGS. 1-6 to perform any one or more of the methodologies discussed herein. For example, replace device 130 as of FIG. 1 or device 230 as of FIG. 2, or device with the first display 110 or device with the second display 120 as described in FIG. 1.

The machine 700 includes a memory 701, a processor 702, a peripherals interface 703, a memory controller 704, a graphics processing unit (GPU) 705, one or more sensors 706. The processor may also be coupled with a function limiting module 707, an activating module 708, and a central processing unit (CPU) 709. The CPU may also be coupled to the peripherals interface 703. The device may further comprise a Radio Frequency (RF) circuitry 721 which may comprise a wi-fi interface and/or a Bluetooth interface. The device may further comprise one or more external ports 722, an audio circuitry 723 which may further connected with one or more speakers 725, and/or microphone 726 etc. The device may further comprise a screen 724 which may be coupled with the peripherals interface 703. These components communicate over one or more communication buses or signal lines. The machine 700 can be, for example, a server, a handheld computer, a tablet computer, a mobile electronic device, a mobile phone, a media player or a personal digital assistant (PDA). For a server, the microphone 726, screen 724 and speakers 725 may not be equipped. The various components shown in FIG. 7 may be implemented in hardware or a combination of hardware and software, including one or more signal processing and/or application specific integrated circuits.

In other embodiments of the present disclosure, the memory 701 may include storage remotely located from the machine 700, for instance network attached storage accessed via the RF circuitry 721 or external port 722 and a communications network (not shown) such as the Internet, intranet(s), Local Area Networks (LANs), Wide Local Area Networks (WLANs), Storage Area Networks (SANs) and the like, or any suitable combination thereof.

The peripherals interface 703 couples the input and output peripherals of the machine 700 to the CPU 709, the GPU 705 and the memory 701. The CPU 709 runs various software programs and/or sets of instructions stored in the memory 701 to perform various functions for the machine 700 and to process data. The GPU 705 handles graphic processing functions for the screen 724. In some embodiments, the graphic processing functions are handled by the CPU 709, so the GPU 705 may be saved.

The external port 722 is adapted for coupling to other devices either directly or remotely over a network. For example, the external port 722 could comprise a Universal Serial Bus (USB), FireWire, memory slot for receiving an external storage medium, etc.

RF (radio frequency) circuitry 721 receives and sends RF signals, also called electromagnetic signals. RF circuitry 721 converts electrical signals to/from electromagnetic signals and communicates with communications networks and other communications devices via the electromagnetic signals. RF circuitry 721 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 721 may communicate with networks, such as the Internet, an intranet and/or a wireless network, such as a cellular telephone network, a wireless local area network (LAN) and/or a metropolitan area network (MAN), and other devices by wireless communication. The wireless communication networks may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol The audio circuitry 723 connects with one or more speakers 725 and a microphone 726. Together these components provide an audio interface between a user and the machine 700. The audio circuitry 723 receives audio data from the peripherals interface 703, converts the audio data to an electrical signal, and transmits the electrical signal to the speaker(s) 725. The speaker(s) 725 converts the electrical signal to human-audible sound waves. The audio circuitry 190 also receives electrical signals converted by the microphone 726 from sound waves. The audio circuitry 723 converts the electrical signal to audio data and transmits the audio data to the peripherals interface 703 for processing. Audio data may be retrieved from and/or transmitted to the memory 701 and/or the RF circuitry 721 by the peripherals interface 703.

The screen 724 may be a touch-screen and provides both an output interface and an input interface between the device and a user. The screen 724 displays visual output to the user that may include text, graphics, video, and any combination thereof. Some or all of the visual output may correspond to user-interface objects, further details of which are described below. The screen 724 may use LCD (liquid crystal display) technology, or other known display technologies. The screen 724 also accepts input from the user based on haptic and/or tactile contact.

The operating system 710 stored in the memory 701 (e.g., Android, RTXC, Linux, UNIX, Apple OS X, Microsoft Windows, or an embedded operating system such as VxWorks) includes various software components and/or drivers for controlling and managing general system tasks (e.g., memory management, storage device control, power management, etc.) and facilitates communication between various hardware and software components. Although many kinds of operating systems may be applied, the following description will use Android as an example to describe embodiments of this invention. Various applications may be installed on the operating system 710.

Although the present disclosure has been described with reference to specific features and embodiments thereof, it should be understood that various changes and substitutions can be made thereto without departing from the spirit and scope of the present disclosure as defined by the following claims.

What is claimed is:

1. A method for providing object information associated with a media program, comprising:
    identifying an object of interest in an image of a frame of the media program, the media program comprising a plurality of scenes;
    inserting an indicator into the image of the frame to identify the object of interest;
    generating a video clip of the media program that is associated with the object of interest, the video clip comprising one or more pieces of the plurality of scenes of the media program;
    constructing an information page containing information regarding the object of interest, wherein the information page comprises a window for displaying the video clip;
    transmitting the media program to a first user device causing the first user device to display the media program on the first user device;
    sending a uniform resource locator (URL) of the information page to a second user device;
    receiving a request for the information page in connection with the first user device displaying the media program; and
    transmitting the information page, including the video clip, to the second user device causing the second user device to replay the video clip of the media program on the second user device, wherein the video clip being replayed on the second user device is focusing on one or more scenes of the object of interest in the media program, and the video clip comprises a most current time stamp of the media program displaying on the first user device, and wherein the most current time stamp records a start-time and an end-time of displaying of the object of interest in the media program on the first user device.

2. The method of claim 1, wherein the indicator is adjacent over the object of interest.

3. The method of claim 1, wherein the indicator is located in a corner of image of the frame.

4. The method of claim 1, further comprising:
    identifying the object of interest in the frame when the object matches an object ID in a product library.

5. The method of claim 1, wherein the first user device and the second user device are different user devices.

6. A server for providing object information associated with a media program, comprising:
a memory storing instructions; and
one or more processors coupled to the memory, wherein the one or more processors execute the instructions to:
identify an object of interest in an image of a frame of the media program, the media program comprising a plurality of scenes;
insert an indicator into the image of the frame to identify the object of interest;
generate a video clip of the media program that is associated with the object of interest based on a portion of the media program, the video clip comprising one or more pieces of the plurality of scenes of the media program;
construct an information page containing information regarding the object of interest, wherein the information page comprises a window for displaying the video clip;
transmit the media program to a first user device causing the first user device to display the media program on the first user device;
send a uniform resource locator (URL) of the information page to a second user device;
receive a request for the information page in connection with the first user device displaying the media program; and
transmit the information page, including the video clip, to the second user device causing the second user device to replay the video clip of the media program on the second user device, wherein the video clip being replayed on the second user device is focusing on one or more scenes of the object of interest in the media program, and the video clip comprises a most current time stamp of the media program displaying on the first user device, and wherein the most current time stamp records a start-time and an end-time of displaying of the object of interest in the media program on the first user device.

7. The server of claim 6, wherein the indicator is adjacent over the object of interest.

8. The server of claim 6, wherein the indicator is located in a corner of the image of the frame.

9. The server of claim 6, further comprising:
identify the object of interest in the frame when the object matches an object ID in a product library.

10. The server of claim 6, wherein the first user device and the second user device are different user devices.

11. A method for providing object information associated with a media program, comprising:
obtaining a uniform resource locator (URL) of an information page associated with an object of interest, wherein the object of interest is presented in a frame of the media program and the frame comprises an indicator identifying the object of interest, wherein the media program comprises a plurality of scenes;
requesting the information page at the URL;
receiving the information page comprising a window for displaying a video clip of the media program, wherein the video clip comprises one or more pieces of the plurality of scenes of the media program, and wherein the video clip is associated with the object of interest based on a portion of the media program; and
displaying the information page and replaying the video clip of the media program in the window on a mobile device while the media program is being displayed on another device, wherein the video clip being replayed on the mobile device is focusing on one or more scenes of the object of interest in the media program, and the video clip comprises a most current time stamp of the media program displaying on the another device, and wherein the most current time stamp records a start-time and an end-time of displaying of the object of interest in the media program on the another device.

12. The method of claim 11, further comprising:
obtaining the URL of the information page upon receiving a user request.

13. The method of claim 11, further comprising:
wherein the URL is shown by a user interface (UI) image, wherein the UI image is shown when an application runs on a mobile device.

14. A mobile device for providing object information associated with a media program, comprising:
a memory storing instructions; and
a processor coupled to the memory, wherein the processor executes the instructions to:
obtain a uniform resource locator (URL) of an information page associated with an object of interest, wherein the object of interest is presented in a frame of the media program and the frame comprises an indicator identifying the object of interest, wherein the media program comprises a plurality of scenes;
request the information page at the URL;
receive the information page comprising a window for displaying a video clip of the media program, wherein the video clip comprises one or more pieces of the plurality of scenes of the media program, and wherein the video clip is associated with the object of interest based on a portion of the media program; and
display the information page and replay the video clip of the media program in the window on the mobile device while the media program is being displayed on another device, wherein the video clip being replayed on the mobile device is focusing on one or more scenes of the object of interest in the media program, and the video clip comprises a most current time stamp of the media program displaying on the another device, and wherein the most current time stamp records a start-time and an end-time of displaying of the object of interest in the media program on the another device.

15. The mobile device of claim 14, further comprising:
obtain the URL of the information page upon receiving a user request.

16. The mobile device of claim 14, further comprising:
wherein the URL is shown by a user interface (UI) image, wherein the UI image is shown when an application runs on a mobile device.

* * * * *